(12) United States Patent
Guo et al.

(10) Patent No.: US 11,332,633 B2
(45) Date of Patent: May 17, 2022

(54) TEXTILE PRINTING

(71) Applicant: Hewlett-Packard Development Company, L.P., Spring, TX (US)

(72) Inventors: Dennis Z. Guo, San Diego, CA (US); Jie Zheng, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 1 day.

(21) Appl. No.: 16/769,967

(22) PCT Filed: Apr. 16, 2018

(86) PCT No.: PCT/US2018/027761
§ 371 (c)(1),
(2) Date: Jun. 4, 2020

(87) PCT Pub. No.: WO2019/203786
PCT Pub. Date: Oct. 24, 2019

(65) Prior Publication Data
US 2020/0385596 A1 Dec. 10, 2020

(51) Int. Cl.
*C09D 11/54* (2014.01)
*B41M 5/00* (2006.01)
(Continued)

(52) U.S. Cl.
CPC ........... *C09D 11/54* (2013.01); *B41M 5/0023* (2013.01); *B41M 5/0047* (2013.01);
(Continued)

(58) Field of Classification Search
CPC ... C09D 11/107; C09D 11/322; C09D 11/101; C09D 11/326; C09D 11/38; C09D 11/36;
(Continued)

(56) References Cited

U.S. PATENT DOCUMENTS 5,607,482 A 3/1997 Reiff et al.
9,644,315 B2 5/2017 Kitagawa et al.
(Continued)

FOREIGN PATENT DOCUMENTS

CA 3019766 10/2017
CN 107033671 8/2017
(Continued)

OTHER PUBLICATIONS

International Search Report dated Dec. 20, 2018 for PCT/US2018/027761, Applicant Hewlett-Packard Development Company, L.P.

*Primary Examiner* — Manish S Shah
(74) *Attorney, Agent, or Firm* — Thorpe North & Western LLP (57) ABSTRACT

A method of textile printing can include ejecting an ink composition onto a fabric substrate and ejecting a blocked polyisocyanate crosslinker onto the fabric substrate. The ink composition can include from 60 wt % to 90 wt % water, from 5 wt % to 30 wt % organic co-solvent, from 1 wt % to 6 wt % pigment, and from 2 wt % to 10 wt % dispersed polymer binder. The method can also include crosslinking the dispersed polymer binder with a deblocked polyisocyanate crosslinker on the fabric substrate.

18 Claims, 3 Drawing Sheets

(51) Int. Cl.
| | |
|---|---|
| *C09D 11/033* | (2014.01) |
| *C09D 11/104* | (2014.01) |
| *C09D 11/107* | (2014.01) |
| *C09D 11/38* | (2014.01) |
| *D06P 1/52* | (2006.01) |
| *D06P 1/54* | (2006.01) |
| *D06P 1/642* | (2006.01) |
| *D06P 5/30* | (2006.01) |

(52) U.S. Cl.
CPC .......... *C09D 11/033* (2013.01); *C09D 11/104* (2013.01); *C09D 11/107* (2013.01); *C09D 11/38* (2013.01); *D06P 1/525* (2013.01); *D06P 1/54* (2013.01); *D06P 1/6424* (2013.01); *D06P 5/30* (2013.01)

(58) Field of Classification Search
CPC ......... C09D 11/40; C09D 11/30; C09D 11/32; C09D 11/324; C09D 11/328; C09D 11/102; C09D 11/005; C09D 11/54; C09D 11/52; C09D 11/106; B41J 11/0021; B41J 2/2107; B41J 2/01; B41J 11/002; B41J 2/211; B41J 2/1433; B41J 2/17; B41J 2/17593; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623; B41J 2202/00; B41J 2202/03; B41J 2/14201; B41J 2/045; B41J 11/0015; B41J 2/04581; B41J 2/055; B41J 2/16538; B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; B41M 5/0023; B41M 7/0081; B41M 3/006; B41M 3/003; B41M 5/0011; B41M 5/0017; B41M 5/0047; B41M 7/00; B41M 7/0072; B41M 5/52; B41M 5/5218; B41M 5/5227; G02B 5/20; G02B 5/223; C08K 3/11; C08K 2003/2237
See application file for complete search history.

(56) References Cited

U.S. PATENT DOCUMENTS

| | | | |
|---|---|---|---|
| 2004/0229976 A1* | 11/2004 | Kakiuchi | C09D 11/322 523/160 |
| 2009/0170986 A1* | 7/2009 | Brust | C09D 11/326 524/104 |
| 2014/0186533 A1* | 7/2014 | Kitagawa | D06P 5/30 427/288 |
| 2016/0032118 A1 | 2/2016 | Morris et al. | |
| 2017/0145238 A1* | 5/2017 | Parazak | B41J 2/01 |
| 2017/0218565 A1 | 8/2017 | Loccufier | |

FOREIGN PATENT DOCUMENTS

| | | |
|---|---|---|
| JP | 2003268271 | 9/2003 |
| JP | 2009215506 | 9/2009 |
| WO | 2017021273 | 2/2017 |
| WO | 2017021278 | 2/2017 |
| WO | 2018043415 | 3/2018 |

\* cited by examiner

TEXTILE PRINTING

BACKGROUND

Inkjet printing has become a popular way of recording images on various media. Some of the reasons include low printer noise, variable content recording, capability of high speed recording, and multi-color recording. These advantages can be obtained at a relatively low price to consumers. As the popularity of inkjet printing increases, the types of use also increase providing demand for new ink compositions. In one example, textile printing can have various applications including the creation of signs, banners, artwork, apparel, wall coverings, window coverings, upholstery, pillows, blankets, flags, tote bags, clothing, etc.

DETAILED DESCRIPTION

The present technology relates to printing on fabric using a pigmented ink composition with a blocked polyisocyanate crosslinker contained therein, or an ink set including a pigmented ink and a separate jettable fluid containing the blocked polyisocyanate crosslinker. The ink composition (with or without the crosslinker) and the separate crosslinker composition where applicable can include a predominant amount of water, organic co-solvent, etc. The ink compositions also include a dispersed polymer binder, such as a latex or polyurethane polymer. In some examples, the fabrics that work well with this system include fabrics with natural fibers such as cotton fabrics, but fabrics blended with synthetic fibers can also be used, such as cotton/polyester fabric blends. The pigmented ink with dispersed polymer binder, when printed using the blocked polyisocyanate crosslinker (in the ink or as a separate fluid) and then heated to deblock the isocyanate group and promote the crosslinking reaction between the latex or polyurethane polymer in the ink composition and the fabric substrate, can generate printed images on the fabric that exhibit good washfastness.

In accordance with this, the present disclosure is drawn to textile printing methods and systems. In one example, a method of textile printing can include ejecting an ink composition onto a fabric substrate and ejecting a blocked polyisocyanate crosslinker onto the fabric substrate. The ink composition can include from 60 wt % to 90 wt % water, from 5 wt % to 30 wt % organic co-solvent, from 1 wt % to 6 wt % pigment, and from 2 wt % to 10 wt % dispersed polymer binder. The method can further include crosslinking the dispersed polymer binder with a deblocked polyisocyanate crosslinker on the fabric substrate. The blocked polyisocyanate crosslinker can be ejected onto the fabric substrate as part of the ink composition. In this instance, the blocked polyisocyanate crosslinker can be included, in one example, in the ink composition at from 0.02 wt % to 2 wt % and the weight ratio of the blocked polyisocyanate crosslinker to dispersed polymer binder can be from 1:100 to 1:12. In another example, the blocked polyisocyanate crosslinker can be ejected onto the fabric substrate as a separate crosslinker composition to contact the ink composition on the fabric substrate (printed in either order or simultaneously). The crosslinker composition can include from 70 wt % to 94.5 water, from 5 wt % to 25 wt % organic co-solvent, and from 0.5 wt % to 10 wt % blocked polyisocyanate crosslinker. In another example, the deblocked polyisocyanate crosslinker can be generated by applying heat to the blocked polyisocyanate crosslinker on the fabric substrate.

In another example, a textile printing system can include a fabric substrate and an ink composition. The ink composition can include from 60 wt % to 90 wt % water, from 5 wt % to 30 wt % organic co-solvent, from 1 wt % to 6 wt % pigment, from 2 wt % to 24 wt % dispersed polymer binder, and from 0.02 wt % to 2 wt % blocked polyisocyanate crosslinker. The weight ratio of the blocked polyisocyanate crosslinker to dispersed polymer binder can be from 1:100 to 1:12. In one example, the blocked polyisocyanate crosslinker can include a blocked polyisocyanate trimer. The blocked polyisocyanate trimer can have the structure shown in Formula I, as follows:

$$(NCO)_3R_3(NHCO)_3(BL)_{3-x}(DL)_x \qquad \text{Formula I}$$

where R can independently include a C2 to C10 branched or straight-chained alkyl, C6 to C20 alicyclic, C6 to C20 aromatic, or a combination thereof; BL can include a blocking group such as a phenol blocking group, a lactam blocking group, an oxime blocking group, a pyrazole blocking group, or a combination thereof; x can be from greater than 0 to 1; and DL can include a hydrophilic dispersing group. In one example, R can be from C4 to C8 alkyl and BL can be a dimethyl pyrazole. The dispersed polymer binder can have an average particle size from 20 nm to 500 nm, and can be an acrylic latex polymer, a styrene acrylic latex polymer, a polyester-polyurethane polymer, or a mixture thereof.

In an alternative example, a textile printing system can include a fabric substrate, an ink composition, and a crosslinker composition. The ink composition can include from 60 wt % to 90 wt % water, from 5 wt % to 30 wt % organic co-solvent, from 1 wt % to 6 wt % pigment, and from 2 wt % to 24 wt % dispersed polymer binder. The crosslinker composition can include from 70 wt % to 94.5 water, from 5 wt % to 25 wt % organic co-solvent, and from 0.5 wt % to 10 wt % blocked polyisocyanate crosslinker. In one example, the blocked polyisocyanate crosslinker can include a blocked polyisocyanate trimer, such as the blocked polyisocyanate trimer shown and described in Formula I above. In this example as well, with respect to Formula I, R can independently include a C2 to C10 branched or straight-chained alkyl, C6 to C20 alicyclic, C6 to C20 aromatic, or a combination thereof; BL can include a blocking group, such as a phenol blocking group, a lactam blocking group, an oxime blocking group, a pyrazole blocking group, or a combination thereof; x can be from greater than 0 to 1; and DL can include a hydrophilic dispersing group. In one specific example, R can be C4 to C8 alkyl and BL can be a dimethylpyrazole. In a more specific example, the blocked polyisocyanate crosslinker can be present in the crosslinker composition at from 1.5 wt % to 4 wt %. The dispersed polymer binder can have an average particle size from 20 nm to 500 nm, and can be an acrylic latex polymer, a styrene acrylic latex polymer, an anionic aliphatic polyester-polyurethane polymer, or a mixture thereof.

As a note, with respect to the textile printing methods and the textile printing systems described herein, more specific descriptions can be considered applicable to other examples whether or not they are explicitly discussed in the context of that example. Thus, for example, in discussing a pigment related to the textile printing system(s), such disclosure is also relevant to and directly supported in context of the method of textile printing, and vice versa.

Figure 1A:
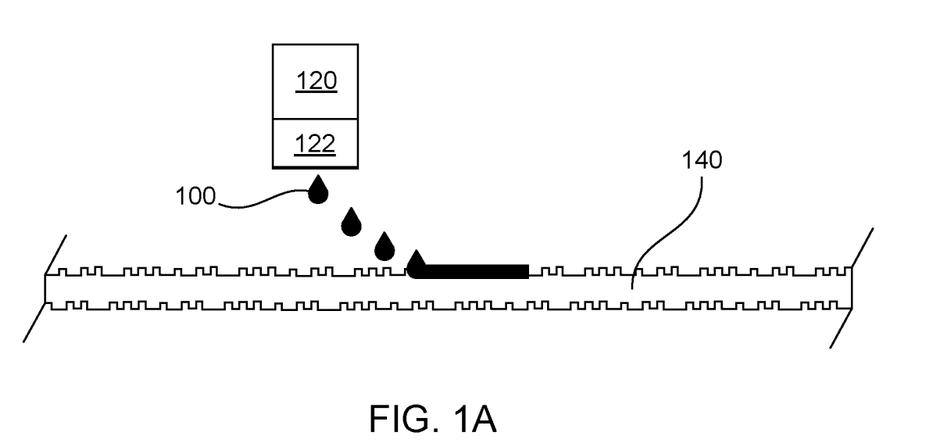
FIG. 1A schematically depicts an example textile printing system that includes an ink composition and a fabric substrate in accordance with the present disclosure.
Figure 1B:
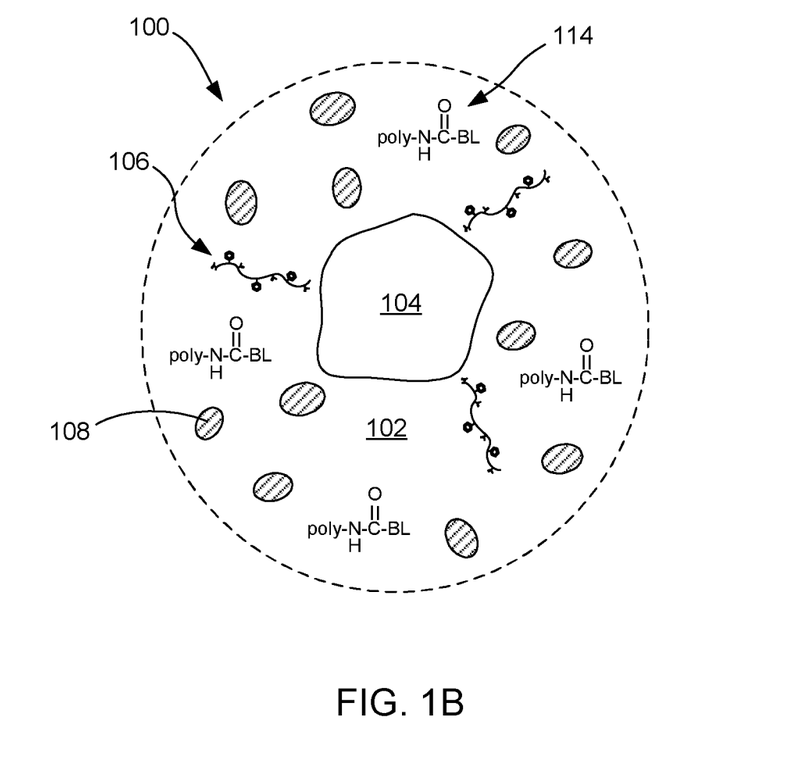
FIG. 1B schematically depicts the example ink composition of FIG. 1A, which can include a pigment and dispersant, a dispersed polymer binder, and a blocked polyisocyanate in accordance with the present disclosure.

As a preliminary matter, it is noted that a textile printing system example where the ink composition includes the blocked polyisocyanate therein (within the ink composition) is shown generally in FIGS. 1A and 1B. On the other hand, a textile printing system where the blocked polyisocyanate is present in a separate crosslinker composition relative to the ink composition is shown generally in FIGS. 2A and 2B. In accordance with this, there can be certain weight percentage ranges and subranges in the ink composition relative to both of these two printing systems that may be the same, such as pigment content, water content, organic co-solvent content, dispersed polymer binder content, etc. The blocked polyisocyanate content, on the other hand, can be included in its respective printing fluid at a different concentration range in the ink composition compared to when present in a separate crosslinker composition. This can be due in part to fluid mixing (dilution) of the crosslinker when printed and mixed on the fabric substrate, so more can be used. In further detail, including too much blocked polyisocyanate directly in the ink composition can generate jettability issues, such as kogation and other printability issues. Thus, when present in the ink composition, the blocked polyisocyanate can be present at from 0.02 wt % to 2 wt %, and when present in a separate crosslinker composition, the concentration can be from 0.5 wt % to 10 wt %, for example. In further detail, the term "polyisocyanate" refers to compounds having multiple isocyanate groups, but in some examples, can include trimers or other compounds more than two blocked isocyanate groups, for example. Thus, the blocked polyisocyanates can be in the form of trimers, pre-polymers, polymers, etc. In accordance with examples herein, the blocked polyisocyanates can be used as crosslinkers with dispersed polymer binder (once deblocked) so available isocyanate moieties can be present on the polyisocyanates after deblocking.

Figure 2A:
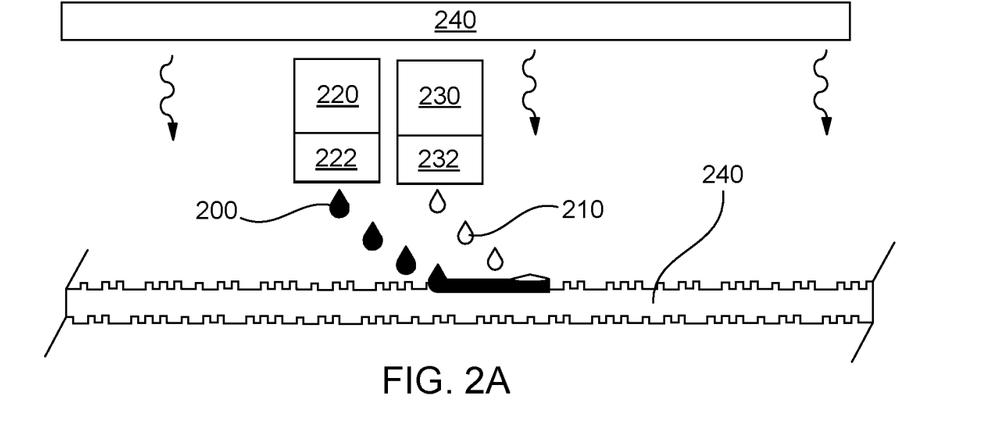
FIG. 2A schematically depicts an example textile printing system that includes an ink composition, a crosslinker composition, and a fabric substrate in accordance with the present disclosure.
Figure 2B:
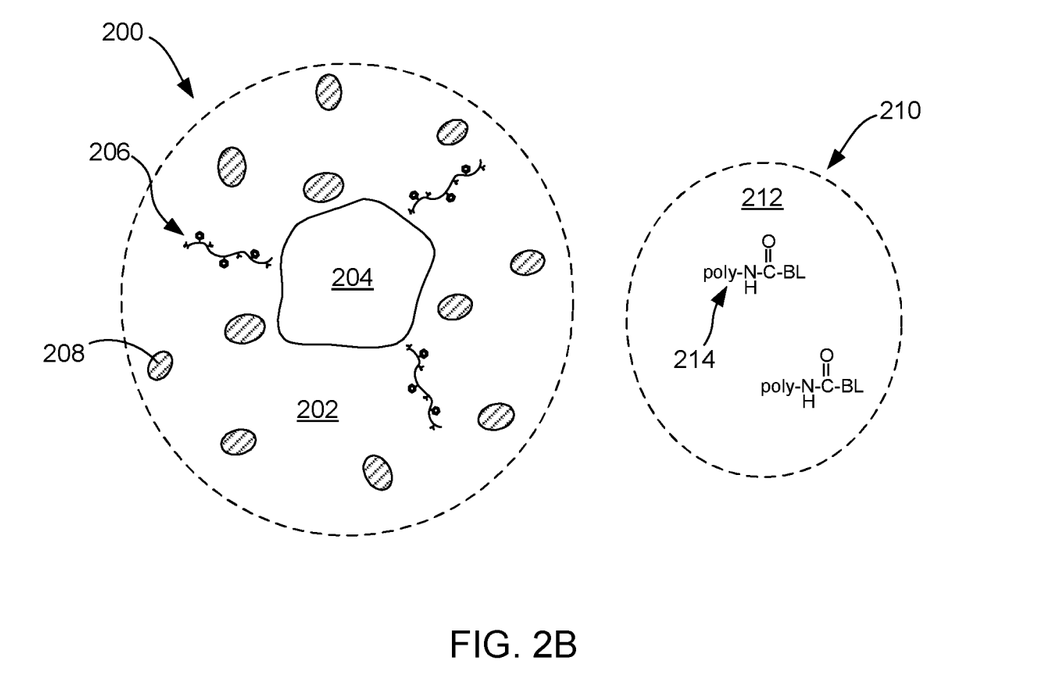
FIG. 2B schematically depicts the example ink composition and example crosslinker composition of FIG. 2A, wherein the ink composition can include a pigment, dispersant, and a dispersed polymer binder, and the crosslinker composition can include a blocked polyisocyanate in accordance with the present disclosure.

With this in mind, FIGS. 1A and 1B are described herein together, which relate to the example where the blocked polyisocyanate is present in the ink composition. Likewise, FIGS. 2A and 2B are described herein together, which relate to examples where the blocked polyisocyanate is present in a separate crosslinker composition. Regardless, other than relative concentration differences, when discussing the blocked polyisocyanate, pigment, dispersant, suspended binder, or other ink or fluid ingredients, such description is relevant to both examples, regardless of the context in which the component or ingredient, system, or method being currently described.

Turning now to FIG. 1A, a textile printing system is shown schematically and can include an ink composition 100 for printing on a fabric substrate 140. For example, the ink composition can be printed from an inkjet pen 120 which includes an ejector 122, such as a thermal inkjet ejector. The ink composition, shown with more detail in FIG. 1B, can include a liquid vehicle 102 (which can include water and organic co-solvent, for example) with from 1 wt % to 6 wt % pigment 104 (or pigment particles or solids) dispersed therein. The pigment can be dispersed by a dispersant 106, such as a polymer dispersant. Example polymer dispersants can include acrylic dispersant, styrene-acrylic dispersant, styrene-maleic dispersant, or a dispersant with aromatic groups and a poly(ethylene oxide) chain, such as Esperse 100 from Evonik (Germany) and Solesperse 2700 from Lubrizol (USA), adsorbed to a surface thereof. A dispersed polymer binder 108 can also be present, e.g., acrylic latex polymer, styrene acrylic polymer, polyester-polyurethane binder, etc. The dispersed polymer binder can be prepared or selected so that it can be crosslinked upon deblocking of the blocked polyisocyanate 114, for example.

In FIGS. 2A and 2B, a textile printing system is shown schematically and can include an ink composition 200 for printing on a fabric substrate 240. For example, the ink composition can be printed from an inkjet pen 220 which includes an ejector 222, such as a thermal inkjet ejector. The textile printing system can also include a crosslinker composition 210 for contacting the ink composition and reacting with the ink composition on the fabric substrate. The crosslinker composition can be printed from a fluidjet pen 230 which includes an ejector 232, such as a thermal fluidjet ejector. The inkjet pen and the fluidjet pen can be the same device or can be a different device. Also shown in FIG. 2A is a heating element 240, which can apply heat to the fabric substrate after printing to deblock the blocked polyisocyanate, thereby causing crosslinking to occur between the polyisocyanate and the dispersed polymer binder and/or other solids that may be present and available for crosslinking. The heating element, though not shown in FIG. 1A, can also be used in that example. Temperatures for heating can range from 100° C. to 200° C. for 30 seconds to 5 minutes, from 120° C. to 180° C. for from 1 to 5 minutes, or from 130° C. to 150° C. for from 2 to 3 minutes.

The ink composition, shown with more detail in FIG. 2B, can include a liquid vehicle 202 (which can include water and organic co-solvent, for example) with from 1 wt % to 6 wt % pigment 204 (or pigment particles or solids) dispersed therein. The pigment can be dispersed by a dispersant 206, for example, such as a polymer dispersant, e.g., acrylic, styrene-acrylic dispersant, styrene-maleic dispersant, or a dispersant with aromatic groups and a poly(ethylene oxide) chain such as Esperse 100 from Evonik (Germany) and Solesperse 2700 from Lubrizol (USA), adsorbed to a surface thereof. A dispersed polymer binder 108 can also be present, e.g., acrylic latex polymer, styrene-acrylic latex polymer, polyester-polyurethane binder, etc. The dispersed polymer binder can be prepared or selected so that it can be crosslinked upon deblocking of the blocked polyisocyanate 214, which can be delivered to the fabric substrate from a separate printing fluid or crosslinker composition, shown at 210 in FIG. 2A, for example. The crosslinker composition can also include a liquid vehicle 212 (which can include water and organic co-solvent, for example), and can include similar components or different components relative to the liquid vehicle of the ink composition.

With more general reference to the various textile printing systems and methods herein, the pigment can be any of a number of pigments of any of a number of primary or secondary colors, or can be black or white, for example. More specifically, colors can include cyan, magenta, yellow, red, blue, violet, red, orange, green, etc. In one example, the ink composition can be a black ink with a carbon black pigment. In another example, the ink composition can be a cyan or green ink with a copper phthalocyanine pigment, e.g., Pigment Blue 15:0, Pigment Blue 15:1; Pigment Blue 15:3, Pigment Green 15:4, Pigment Green 7, Pigment Green 36, etc. In another example, the ink composition can be a magenta ink with a quinacridone pigment or a co-crystal of quinacridone pigments. Example quinacridone pigments that can be utilized can include PR122, PR192, PR202, PR206, PR207, PR209, PO48, PO49, PV19, PV42, or the like. These pigments tend to be magenta, red, orange, violet, or other similar colors. In one example, the quinacridone pigment can be PR122, PR202, PV19, or a combination thereof. In another example, the ink composition can be a yellow ink with an azo pigment, e.g., Pigment Yellow 74 and Pigment Yellow 155.

The pigment can be dispersed by a dispersant, such as a styrene (meth)acrylate dispersant, or another dispersant suitable for keeping the pigment suspended in the liquid vehicle. For example, the dispersant can be any dispersing (meth) acrylate polymer, or other type of polymer, such as maleic polymer, for example, however, the (meth)acrylate polymer can be a styrene-acrylic type dispersant polymer, as it can promote π-stacking between the aromatic ring of the dispersant and various types of pigments, such as copper phthalocyanine pigments, for example. In one example, the styrene-acrylic dispersant can have a weight average molecular weight from 4,000 Mw to 30,000 Mw. In another example, the styrene-acrylic dispersant can have a weight average molecular weight of 8,000 Mw to 28,000 Mw, from 12,000 Mw to 25,000 Mw, from 15,000 Mw to 25,000 Mw, from 15,000 Mw to 20,000 Mw, or about 17,000 Mw. Regarding the acid number, the styrene-acrylic dispersant can have an acid number from 100 to 350, from 120 to 350, from 150 to 300, from 180 to 250, or about 214, for example. Example commercially available styrene-acrylic dispersants can include Joncryl® 671, Joncryl® 71, Joncryl® 96, Joncryl® 680, Joncryl® 683, Joncryl® 678, Joncryl® 690, Joncryl® 296, Joncryl® 671, Joncryl® 696 or Joncryl® ECO 675 (all available from BASF Corp., Germany).

The term "(meth)acrylate" or "(meth)acrylic acid" or the like refers to monomers, copolymerized monomers, etc., that can either be acrylate or methacrylate (or a combination of both), or acrylic acid or methacrylic acid (or a combination of both). This can be the case for either dispersant polymer for pigment dispersion or for dispersed polymer binder that may include co-polymerized acrylate and/or methacrylate monomers. Also, in some examples, the terms "(meth) acrylate" and "(meth)acrylic acid" can be used interchangeably, as acrylates and methacrylates described herein include salts of acrylic acid and methacrylic acid, respectively. Thus, mention of one compound over another can be a function of pH. Furthermore, even if the monomer used to form the polymer was in the form of a (meth)acrylic acid during preparation, pH modifications during preparation or subsequently when added to an ink composition can impact the nature of the moiety as well (acid form vs. salt form). Thus, a monomer or a moiety of a polymer described as (meth) acrylic acid or as (meth)acrylate should not be read so rigidly as to not consider relative pH levels, and other general organic chemistry concepts.

In further detail, the ink compositions can also include a dispersed polymer binder. The term "dispersed polymer binder" generally refers to any dispersed latex polymer or other resins that are dispersed within the ink composition and have an average particle size from 20 nm to 500 nm, for example. Example dispersed polymers can include latex polymer, polyurethane dispersed polymer, including poly-ester-polyurethanes (aliphatic or aromatic), etc., and others. In further detail, the weight average molecular weight of the dispersed polymer binder can be from 20,000 Mw to 500,000 Mw. In other examples, the weight average molecular weight can be from 50,000 Mw to 500,000 Mw, from 100,000 Mw to 400,000 Mw, or from 150,000 Mw to 300,000 Mw. The acid number of the dispersed polymer binder can be from 2 mg KOH/g to 200 mg KOH/g, from 5 mg KOH/g to 100 mg KOH/g, or from 20 mg KOH/g to 50 mg KOH/g, for example. In further examples, the dispersed polymer binder can have an average particle size ranging from 20 nm to 500 nm, from 50 nm to 350 nm, or from 150 nm to 300 nm. The particle size of any solids herein, including the average particle size of the dispersed polymer binder, can be determined using a Nanotrac® Wave device, from Microtrac, which measures particles size using dynamic light scattering. Average particle size can be determined using particle size distribution data generated by the Nanotrac® Wave device.

As mentioned, the dispersed polymer binder can be a latex polymer prepared from acrylate (or acrylic acid) monomers, methacrylate (or methacrylic acid) monomers, styrene, modified-styrene such as phenoxyalkyl (meth)acrylates or others, or any of a number of other monomers. The term "alkyl" or "aliphatic" or the like refers to methyl, ethyl, or branched or unbranched saturated carbon chains from C2 to C10, for example. Thus, as an example, "phenoxyalkyl (meth)acrylate" indicates the presence of a phenoxyl group with a C1 to C8 alkyl group joining the phenoxyl group to either an acrylic acid or a methacrylic acid moiety (or an acrylate or a methacrylate moiety).

In still further detail, the latex polymer can include copolymerized lower alkyl (C1-C5) modified-acrylates (linear or branched); copolymerized alicyclic (meth)acrylates; copolymerized aromatic (meth)acrylates, etc. Examples include ethyl acrylate, ethyl methacrylate, benzyl acrylate, benzyl methacrylate, propyl acrylate, propyl methacrylate, isopropyl acrylate, isopropyl methacrylate, butyl acrylate, butyl methacrylate, isobutyl acrylate, isobutyl methacrylate, hexyl acrylate, hexyl methacrylate, isooctyl acrylate, isooctyl methacrylate, octadecyl acrylate, octadecyl methacrylate, lauryl acrylate, lauryl methacrylate, hydroxyethyl acrylate, hydroxyethyl methacrylate, hydroxyhexyl acrylate, hydroxyhexyl methacrylate, hydroxyoctadecyl acrylate, hydroxyoctadecyl methacrylate, hydroxylauryl methacrylate, hydroxylauryl acrylate, 2-ethylhexyl acrylate, 2-ethylhexyl methacrylate, or combinations thereof. Examples of the cycloaliphatic (meth)acrylate monomers (including salts) can include cyclohexyl acrylate, cyclohexyl methacrylate, methylcyclohexyl acrylate, methylcyclohexyl methacrylate, trimethylcyclohexyl acrylate, trimethylcyclohexyl methacrylate, tert-butylcyclohexyl acrylate, tert-butylcyclohexyl methacrylate, and combinations thereof. In further examples, cycloaliphatic monomer can include cyclohexyl acrylate, cyclohexyl methacrylate, methylcyclohexyl acrylate, methylcyclohexyl methacrylate, trimethylcyclohexyl acrylate, trimethylcyclohexyl methacrylate, tert-butylcyclohexyl acrylate, tert-butylcyclohexyl methacrylate, or a combination thereof. In still further examples, more specific aromatic (meth)acrylate monomers can include 2-phenoxyethyl methacrylate, 2-phenoxyethyl acrylate, phenyl propyl methacrylate, phenyl propyl acrylate, benzyl methacrylate, benzyl acrylate, phenylethyl methacrylate, phenylethyl acrylate, benzhydryl methacrylate, benzhydryl acrylate, 2-hydroxy-3-phenoxypropyl acrylate, 2-hydroxy-3-phenoxypropyl methacrylate, N-benzyl methacrylamide, N-benzyl acrylamide, N,N-diphenyl methacrylamide, N,N-diphenyl acrylamide, naphthyl methacrylate, naphthyl acrylate, phenyl methacrylate, phenyl acrylate, or a combination thereof.

In some examples, the latex particles can include a single heteropolymer that is homogenously copolymerized or can include a first heteropolymer phase and a second heteropolymer phase. The two phases can be composited together, included as separate latex particles, in a core-shell configuration, a two-hemisphere configuration, smaller spheres of one phase distributed in a larger sphere of the other phase, interlocking intermingled strands of the two phases, and so on. The second heteropolymer phase can have a higher $T_g$ than the first heteropolymer phase. The first heteropolymer composition may be considered a soft polymer composition and the second heteropolymers composition may be considered a hard polymer composition. In further detail, the first heteropolymer composition can be present in the latex polymer in an amount ranging from about 15 wt % to about 70 wt % of a total weight of the polymer particle, and the second heteropolymer composition can be present in an amount ranging from about 30 wt % to about 85 wt % of the total weight of the polymer particle. In other examples, the first heteropolymer composition can be present in an amount ranging from about 30 wt % to about 50 wt % of a total weight of the polymer particle, and the second heteropolymer composition can be present in an amount ranging from about 50 wt % to about 70 wt % of the total weight of the polymer particle.

In one specific example, the latex polymer can be a single-phase or dual-phase copolymer of styrene, a (meth)acrylate (e.g., butyl acrylate), a (meth)acrylic acid, etc. In one example, two different latex polymers can be composited together as a core-shell or dual-phase polymer, or as a co-dispersion of two different latex polymers, or as two separate polymer strands that are intermingled or entangled together. For example, one latex polymer can include styrene and butyl acrylate; and another latex polymer of the dual-phase dispersion can include styrene, methyl (meth)acrylate, a lower alkyl acrylate (e.g., butyl acrylate), and (meth)acrylic acid. The average particle size of the dual-phase latex polymer can be from 150 nm to about 300 nm, for example.

The latex polymer can be prepared by flowing monomer streams into a reactor (or multiple monomer streams with dual-phase latex polymers). An initiator can also be included in the reactor. The initiator may be selected from a persulfate, such as a metal persulfate or an ammonium persulfate, e.g., sodium persulfate, ammonium persulfate, or potassium persulfate. In some examples, a copolymerizable surfactant can be used, such as Hitenol® BC-10 from Dai-Ichi Kogyo Seiyaku Co., Ltd (Japan), in some instances. Furthermore, residual monomer after reactions are complete or the latex polymer is formed by adding organic acid, such as ascorbic acid, and an alkyl peroxide, e.g., t-butyl hydroperoxide.

An alternative dispersed polymer binder that can be used is a polyurethane binder, and in one example, a polyester-polyurethane binder. The polyester-polyurethane binder can be anionic in one example, and in another example, can be aliphatic including saturated carbon chains as part of the polymer backbone or side-chain thereof, e.g., C2 to C10, C3 to C8, or C3 to C6. These polyester-polyurethane binders are described as aliphatic because the carbon chains therein are saturated and because they are devoid of aromatic moieties. An example anionic aliphatic polyester-polyurethane binder that can be used is Impranil® DLN-SD (CAS#375390-41-3; Mw 133,000 Mw; Acid Number 5.2; Tg −47° C.; Melting Point 175-200° C.) from Covestro (Germany). Alternatively, the polyester-polyurethane binder can be aromatic (or include an aromatic moiety) along with aliphatic moieties. An example of an aromatic polyester-polyurethane binder that can be used is Dispercoll U42 (CAS #157352-07-3; prepared from a polyester of phthalic acid and hexane-1,6-diol, hexanemethylene-1,6-diisocyanate (HDI), and a diamine sulfonic acid). Other polyurethane types can also be used other than the polyester-type polyurethanes. That being stated, due to the crosslinking reaction that occurs when the blocked polyisocyanate is heated and deblocked on the fabric substrate, the crosslinking effect of the polyisocyanate can provide effective results for these various types of polyurethanes as well.

The ink compositions of the present disclosure can be formulated to include an aqueous liquid vehicle, which can include the water content, e.g., 60 wt % to 90 wt % or from 75 wt % to 85 wt %, as well as organic co-solvent, e.g., from 4 wt % to 30 wt %, from 6 wt % to 20 wt %, or from 8 wt % to 15 wt %. Other liquid vehicle components can also be included, such as surfactant, antibacterial agent, other colorant, etc. However, as part of the ink composition, pigment, dispersant, and the latex polymer can be included or carried by the liquid vehicle components. Suitable pH ranges for the ink composition can be from pH 7 to pH 11, from pH 7 to pH 10, from pH 7.2 to pH 10, from pH 7.5 to pH 10, from pH 8 to pH 10, 7 to pH 9, from pH 7.2 to pH 9, from pH 7.5 to pH 9, from pH 8 to pH 9, from 7 to pH 8.5, from pH 7.2 to pH 8.5, from pH 7.5 to pH 8.5, from pH 8 to pH 8.5, from 7 to pH 8, from pH 7.2 to pH 8, or from pH 7.5 to pH 8.

In further detail regarding the aqueous liquid vehicle, co-solvent(s) can be present and can include any co-solvent or combination of co-solvents that is compatible with the pigment, dispersant, and polymer latex. Examples of suitable classes of co-solvents include polar solvents, such as alcohols, amides, esters, ketones, lactones, and ethers. In additional detail, solvents that can be used can include aliphatic alcohols, aromatic alcohols, diols, glycol ethers, polyglycol ethers, caprolactams, formamides, acetamides, and long chain alcohols. Examples of such compounds include primary aliphatic alcohols, secondary aliphatic alcohols, 1,2-alcohols, 1,3-alcohols, 1,5-alcohols, ethylene glycol alkyl ethers, propylene glycol alkyl ethers, higher homologs ($C_6$-$C_{12}$) of polyethylene glycol alkyl ethers, N-alkyl caprolactams, unsubstituted caprolactams, both substituted and unsubstituted formamides, both substituted and unsubstituted acetamides, and the like. More specific examples of organic solvents can include 2-pyrrolidone, 2-ethyl-2-(hydroxymethyl)-1, 3-propane diol (EPHD), glycerol, dimethyl sulfoxide, sulfolane, glycol ethers, alkyldiols such as 1,2-hexanediol, and/or ethoxylated glycerols such as LEG-1, etc.

The aqueous liquid vehicle can also include surfactant. In general, the surfactant can be water soluble and may include alkyl polyethylene oxides, alkyl phenyl polyethylene oxides, polyethylene oxide (PEO) block copolymers, acetylenic PEO, PEO esters, PEO amines, PEO amides, dimethicone copolyols, ethoxylated surfactants, alcohol ethoxylated surfactants, fluorosurfactants, and mixtures thereof. In some examples, the surfactant can include a nonionic surfactant, such as a Surfynol® surfactant, e.g., Surfynol® 440 (from Evonik, Germany), or a Tergitol™ surfactant, e.g., Tergitol™ TMN-6 (from Dow Chemical, USA). In another example, the surfactant can include an anionic surfactant, such as a phosphate ester of a C10 to C20 alcohol or a polyethylene glycol (3) oleyl mono/di phosphate, e.g., Crodafos® N3A (from Croda International PLC, United Kingdom). The surfactant or combinations of surfactants, if present, can be included in the ink composition at from about 0.01 wt % to about 5 wt % and, in some examples, can be present at from about 0.05 wt % to about 3 wt % of the ink compositions.

Consistent with the formulations of the present disclosure, various other additives may be included to provide desired properties of the ink composition for specific applications. Examples of these additives are those added to inhibit the growth of harmful microorganisms. These additives may be biocides, fungicides, and other microbial agents, which are routinely used in ink formulations. Examples of suitable microbial agents include, but are not limited to, Acticide®, e.g., Acticide® B20 (Thor Specialties Inc.), Nuosept™ (Nudex, Inc.), Ucarcide™ (Union carbide Corp.), Vancide® (R.T. Vanderbilt Co.), Proxel™ (ICI America), and combinations thereof. Sequestering agents, such as EDTA (ethylene diamine tetra acetic acid) or trisodium salt of methylglycinediacetic acid, may be included to eliminate the deleterious effects of heavy metal impurities, and buffer solutions may be used to control the pH of the ink. Viscosity modifiers and buffers may also be present, as well as other additives known to those skilled in the art to modify properties of the ink as desired.

Turning now to blocked polyisocyanate that can be present in the ink composition or in a separate crosslinker composition, the isocyanate groups of the blocked polyisocyanates can be reactive as crosslinkers when printed on the fabric substrate, but within the ink composition or the crosslinker composition, the isocyanate groups can remain stable due to the blocking group attached to the isocyanate(s). Thus, the term "blocked polyisocyanate" refers to compounds with multiple isocyanate groups where a plurality of the isocyanate groups are coupled to a chemical moiety that stabilize the isocyanate groups in the ink composition or crosslinker composition so that they remain available for reaction after printing on the fabric substrate. The chemical moiety that prevents the isocyanate groups from reacting can be referred to herein as a "blocking group." To convert the blocked polyisocyanate to a reactive species, the blocking group can be dissociated from isocyanate groups to result in a "deblocked polyisocyanate." Deblocking can occur in by heating the blocked polyisocyanate to a temperature where deblocking or dissociation can occur, e.g., typically at from 100° C. to 200° C. There are deblocking or dissociation temperatures outside of this range, e.g., at lower temperatures, but in accordance with examples of the present disclosure, higher temperature deblocking in some examples can have the added benefit of softening or melting the latex polymer that is to be crosslinked with the deblocked polyisocyanate.

A blocked polyisocyanate and the deblocking that can occur can be represented by example in Formulas II or III, as follows:

Formula II

Formula III

In Formula II and Formula III above, R can be a linking group that connects the blocked isocyanate group shown to any organic group that includes other blocked isocyanates (as the blocked isocyanates used in accordance with the present disclosure is a blocked "poly" isocyanates, meaning that the crosslinker composition includes more than one isocyanate group). For example, R can independently include a C2 to C10 branched or straight-chained alkyl, C6 to C20 alicyclic, C6 to C20 aromatic, or a combination thereof. The asterisk (*) denotes the organic group with additional blocked isocyanate groups that extend beyond the R linking group (see Formula IV below, for example, which includes the balance of a polyisocyanate trimer including two additional isocyanate groups). In further detail, R' in Formula II and Formula III can be any organic group that can be coupled to the hydroxyl or amine group to replace the blocking group (BL) of the isocyanate, typically liberating a hydrogen to associate with the blocking group, as shown. In one example, R'—OH or R'—NH$_2$ can be a residual group present in the latex or polyester polyurethane binder in the ink, and in other examples, the R'—OH group can be present in cotton and cotton blend fabric substrates. In further detail, regarding the dispersed polymer binder, the binder can be crosslinked when the blocked polyisocyanate is deblocked on the fabric substrate, such as with a fabric substrate including cotton fibers, or a blend of cotton and polyester fibers, for example.

An example blocked polyisocyanate that can be used is a blocked polyisocyanate trimer having the structure shown in Formula IV, as follows:

Formula IV where R is independently a C2 to C10 branched or straight-chained alkyl, C6 to C20 alicyclic, C6 to C20 aromatic, or a combination thereof; and Z independently includes a blocking group (also referred to as "BL" or "BL groups"), a hydrophilic dispersing group (also referred to as "DL" or "DL groups"), or a combination of both. Typically, the three independent Z groups shown in Formula IV can represent from 2 to 3 blocking groups (BL) and from 0 to 1 hydrophilic dispersing groups (DL) per trimer molecule. Thus, in some examples, there may be no hydrophilic groups, and in other examples there may be from 0.1 to 1 hydrophilic groups in the ink composition or crosslinker composition. Example BL groups that can be present include a phenol blocking group, a lactam blocking group, an oxime blocking group, a pyrazole blocking group, or a combination thereof. The hydrophilic dispersing group can be an anionic or a non-ionic hydrophilic group to assist with dispersing the blocked polyisocyanate in the aqueous ink composition or the aqueous crosslinker composition. An example hydrophilic dispersing group that can be used is N-(2-aminoethyl)-beta-alanine. Thus, with specific reference to Z in Formula IV, there may be some specific individual molecules with three BL groups, and other individual molecules within the ink composition or crosslinker composition that include less than three BL groups. In further detail, Formula IV can be expressed to include the hydrophilic groups (DL) associated with the blocking groups (BL), shown previously in Formula I, and shown again below, as follows:

$$(NCO)_3R_3(NHCO)_3(BL)_{3-x}(DL)_x \qquad \text{Formula I}$$

where x is from 0 to 1; DL is a hydrophilic dispersing group, such as an anionic or a non-ionic hydrophilic group that can assist with dispersing the blocked polyisocyanate in the ink composition or the crosslinker composition, e.g., N-(2-aminoethyl)-beta-alanine; and BL is a blocking group, such as a phenol blocking group, a lactam blocking group, an oxime blocking group, a pyrazole blocking group, or a combination thereof. Notably, group Z is not shown in Formula I, as Z represents a combination of both BL and DL (when present). In one example, the blocking group, once liberated (as BL-H) can be ε-caprolactam, butanone oxime, or 3,5-dimethyl pyrazole, for example. If DL is present, it can be present at from greater than 0 to 1, or from 0.1 to 1, or from 0.25 to 1, or from 0.5 to 1, or from 0.1 to 0.5, for example. Again, R can independently be a C2 to C10 branched or straight-chained alkyl, C6 to C20 alicyclic, C6 to C20 aromatic, or a combination thereof. In a still more specific example, x can be from greater than 0 to 1, BL can be a dimethylpyrazole, DL can be N-(2-aminoethyl)-beta-alanine or a salt thereof, and R can be C4 to C8 alkyl or C8 to C14 methylated alicyclic group. In this example, because N-(2-aminoethyl)-beta-alanine is present, x is greater than 0, e.g., from 0.1 to 1. The concentration of DL present can depend on the concentration useful for suspending the blocked polyisocyanate in the ink composition or the crosslinker composition. In further detail, example R groups include those present to complete IPDI trimers, e.g., methylated alicyclic R groups (sometimes also referred to as cycloaliphatic groups) such as present in N,N',N"-Tris(5-isocyanato-1,3,3-trimethylcyclohexylmethyl)-2,4,6-triketo-hexahydrotriazine; or a HDI trimers, e.g., where R may be C2 to C10 alkyl, C2 to C8 alkyl, C2 to C6 alkyl, C3 to C8 alkyl, C4 to C8 alkyl, or C4 to C10 alkyl, such as Desmodur N3300 from Covestro Corporation (Germany).

Two specific examples of blocked polyisocyanates that can be used include Imprafix® 2794 from Covestro (Germany) and Matsui Fixer WF-N from Matsui Shikiso Chemical (Japan). Imprafix® 2794 is an HDI trimer blocked by 3,5-dimethyl pyrazole and further includes N-(2-aminoethyl)-beta-alaninate. This material can be deblocked at about 130° C. Matsui Fixer WF-N, on the other hand is also a blocked polyisocyanate, but is nonionic. This material can be deblocked at about 150° C. Other example blocked polyisocyanates that can be used include, for example Bayhydur BL 2867 from Covestro (Germany), Trixene Aqua BI from Baxenden (UK) and Vestanat EP-DS 1205 E from Evonik (Germany).

The concentration of blocked polyisocyanate on the printed fabric substrate can be from about 1 wt % to about 10 wt %, based on the dispersed polymer binder content also on the printed fabric substrate and in contact with the blocked polyisocyanate. Above 10 wt % of the weight of the dispersed polymer binder content, the hand feel of the fabric substrates begins to be poor. Furthermore, when loading too much blocked polyisocyanate in an ink composition in the presence of the dispersed polymer binder, and an even higher concentration in the crosslinker composition (which typically does not include the dispersed polymer binder), jettability can suffer, particularly from thermal inkjet pens.

The ink compositions and blocked polyisocyanate of the present textile printing systems can be suitable for printing on many types of textiles, but can be particularly effective with high image quality and good washfastness on fabric substrates with cotton fibers, including treated and untreated cotton substrates, as well as treated and untreated cotton/polyester blends. Other types of fabrics can be used, including various fabrics of natural and/or synthetic fibers. Example natural fiber fabrics that can be used include treated or untreated natural fabric textile substrates, e.g., wool, cotton, silk, linen, jute, flax, hemp, rayon fibers, thermoplastic aliphatic polymeric fibers derived from renewable resources (e.g. cornstarch, tapioca products, sugarcanes), etc. Example synthetic fibers used in the fabric substrates can include polymeric fibers such as, nylon fibers, polyvinyl chloride (PVC) fibers, PVC-free fibers made of polyester, polyamide, polyimide, polyacrylic, polypropylene, polyethylene, polyurethane, polystyrene, polyaramid (e.g., Kevlar®) polytetrafluoroethylene (Teflon®) (both trademarks of E. I. du Pont de Nemours Company, Delaware), fiberglass, polytrimethylene, polycarbonate, polyethylene terephthalate, polyester terephthalate, polybutylene terephthalate, or a combination thereof. In some examples, the fiber can be a modified fiber from the above-listed polymers. The term "modified fiber" refers to one or both of the polymeric fiber and the fabric as a whole having undergone a chemical or physical process such as, but not limited to, copolymerization with monomers of other polymers, a chemical grafting reaction to contact a chemical functional group with one or both the polymeric fiber and a surface of the fabric, a plasma treatment, a solvent treatment, acid etching, or a biological treatment, an enzyme treatment, or antimicrobial treatment to prevent biological degradation.

The fabric substrate can be in one of many different forms, including, for example, a textile, a cloth, a fabric material, fabric clothing, or other fabric product suitable for applying ink, and the fabric substrate can have any of a number of fabric structures. The term "fabric structure" is intended to include structures that can have warp and weft, and/or can be woven, non-woven, knitted, tufted, crocheted, knotted, and pressured, for example. The terms "warp" and "weft" have their ordinary meaning in the textile arts, as used herein, e.g., warp refers to lengthwise or longitudinal yarns on a loom, while weft refers to crosswise or transverse yarns on a loom.

It is notable that the term "fabric substrate" or "fabric media substrate" does not include materials commonly known as any kind of paper (even though paper can include multiple types of natural and synthetic fibers or mixtures of both types of fibers). Fabric substrates can include textiles in filament form, textiles in the form of fabric material, or textiles in the form of fabric that has been crafted into finished articles (e.g. clothing, blankets, tablecloths, napkins, towels, bedding material, curtains, carpet, handbags, shoes, banners, signs, flags, etc.). In some examples, the fabric substrate can have a woven, knitted, non-woven, or tufted fabric structure. In one example, the fabric substrate can be a woven fabric where warp yarns and weft yarns can be mutually positioned at an angle of about 90°. This woven fabric can include but is not limited to, fabric with a plain weave structure, fabric with twill weave structure where the twill weave produces diagonal lines on a face of the fabric, or a satin weave. In another example, the fabric substrate can be a knitted fabric with a loop structure. The loop structure can be a warp-knit fabric, a weft-knit fabric, or a combination thereof. A warp-knit fabric refers to every loop in a fabric structure that can be formed from a separate yarn mainly introduced in a longitudinal fabric direction. A weft-knit fabric refers to loops of one row of fabric that can be formed from the same yarn. In a further example, the fabric substrate can be a non-woven fabric. For example, the non-woven fabric can be a flexible fabric that can include a plurality of fibers or filaments that are one or both bonded together and interlocked together by a chemical treatment process (e.g., a solvent treatment), a mechanical treatment process (e.g., embossing), a thermal treatment process, or a combination of multiple processes.

As previously mentioned, the fabric substrate can be a combination of fiber types, e.g. a combination of natural fiber with another natural fiber, natural fiber with a synthetic fiber, a synthetic fiber with another synthetic fiber, or mixtures of multiple types of natural fibers and/or synthetic fibers in any of the above combinations. In some examples, the fabric substrate can include natural fiber and synthetic fiber, e.g., cotton/polyester blend. The amount of each fiber type can vary. For example, the amount of the natural fiber can vary from about 5 wt % to about 94.5 and the amount of synthetic fiber can range from about 5 wt % to 94.5. In yet another example, the amount of the natural fiber can vary from about 10 wt % to 80 wt % and the synthetic fiber can be present from about 20 wt % to about 90 wt %. In other examples, the amount of the natural fiber can be about 10 wt % to 90 wt % and the amount of synthetic fiber can also be about 10 wt % to about 90 wt %. Likewise, the ratio of natural fiber to synthetic fiber in the fabric substrate can vary. For example, the ratio of natural fiber to synthetic fiber can be 1:1, 1:2, 1:3, 1:4, 1:5, 1:6, 1:7, 1:8, 1:9, 1:10, 1:11, 1:12, 1:13, 1:14, 1:15, 1:16, 1:17, 1:18, 1:19, 1:20, or vice versa.

In one example, the fabric substrate can have a basis weight ranging from about 10 gsm to about 500 gsm. In another example, the fabric substrate can have a basis weight ranging from about 50 gsm to about 400 gsm. In other examples, the fabric substrate can have a basis weight ranging from about 100 gsm to about 300 gsm, from about 75 gsm to about 250 gsm, from about 125 gsm to about 300 gsm, or from about 150 gsm to about 350 gsm.

In addition, the fabric substrate can contain additives including, but not limited to, colorant (e.g., pigments, dyes, and tints), antistatic agents, brightening agents, nucleating agents, antioxidants, UV stabilizers, and/or fillers and lubricants, for example. Alternatively, the fabric substrate may be pre-treated in a solution containing the substances listed above before applying other treatments or coating layers.

Regardless of the substrate, whether natural, synthetic, blends thereof, treated, untreated, etc., the fabric substrates printed with the fluid sets of the present disclosure can provide acceptable optical density (OD) and/or washfastness properties. The term "washfastness" can be defined as the OD that is retained or delta E ($\Delta E$) after five (5) standard washing machine cycles using warm water and a standard clothing detergent (e.g., Tide® available from Proctor and Gamble, Cincinnati, Ohio, USA). Essentially, by measuring OD and/or L*a*b* both before and after washing, $\Delta$OD and $\Delta E$ value can be determined, which is essentially a quantitative way of expressing the difference between the OD and/or L*a*b* prior to and after undergoing the washing cycles. Thus, the lower the $\Delta$OD and $\Delta E$ values, the better. In further detail, $\Delta E$ is a single number that represents the "distance" between two colors, which in accordance with the present disclosure, is the color (or black) prior to washing and the modified color (or modified black) after washing.

Colors, for example, can be expressed as CIELAB values. It is noted that color differences may not be symmetrical going in both directions (pre-washing to post washing vs. post-washing to pre-washing). Using the CIE 1976 definition, the color difference can be measured and the $\Delta E$ value calculated based on subtracting the pre-washing color values of L*, a*, and b* from the post-washing color values of L*, a*, and b*. Those values can then be squared, and then a square root of the sum can be determined to arrive at the $\Delta E$ value. The 1976 standard can be referred to herein as "$\Delta E_{CIE}$." The CIE definition was modified in 1994 to address some perceptual non-uniformities, retaining the L*a*b* color space, but modifying to define the L*a*b* color space with differences in lightness (L*), chroma (C*), and hue (h*) calculated from L*a*b* coordinates. Then in 2000, the CIEDE standard was established to further resolve the perceptual non-uniformities by adding five corrections, namely i) hue rotation ($R_T$) to deal with the problematic blue region at hue angles of about 275°), ii) compensation for neutral colors or the primed values in the L*C*h differences, iii) compensation for lightness ($S_L$), iv) compensation for chroma ($S_C$), and v) compensation for hue ($S_H$). The 2000 modification can be referred to herein as "$\Delta E_{2000}$." In accordance with examples of the present disclosure, $\Delta E$ value can be determined using the CIE definition established in 1976, 1994, and 2000 to demonstrate washfastness. However, in the examples of the present disclosure, $\Delta E_{CIE}$ and $\Delta E_{2000}$ are used.

Figure 3:
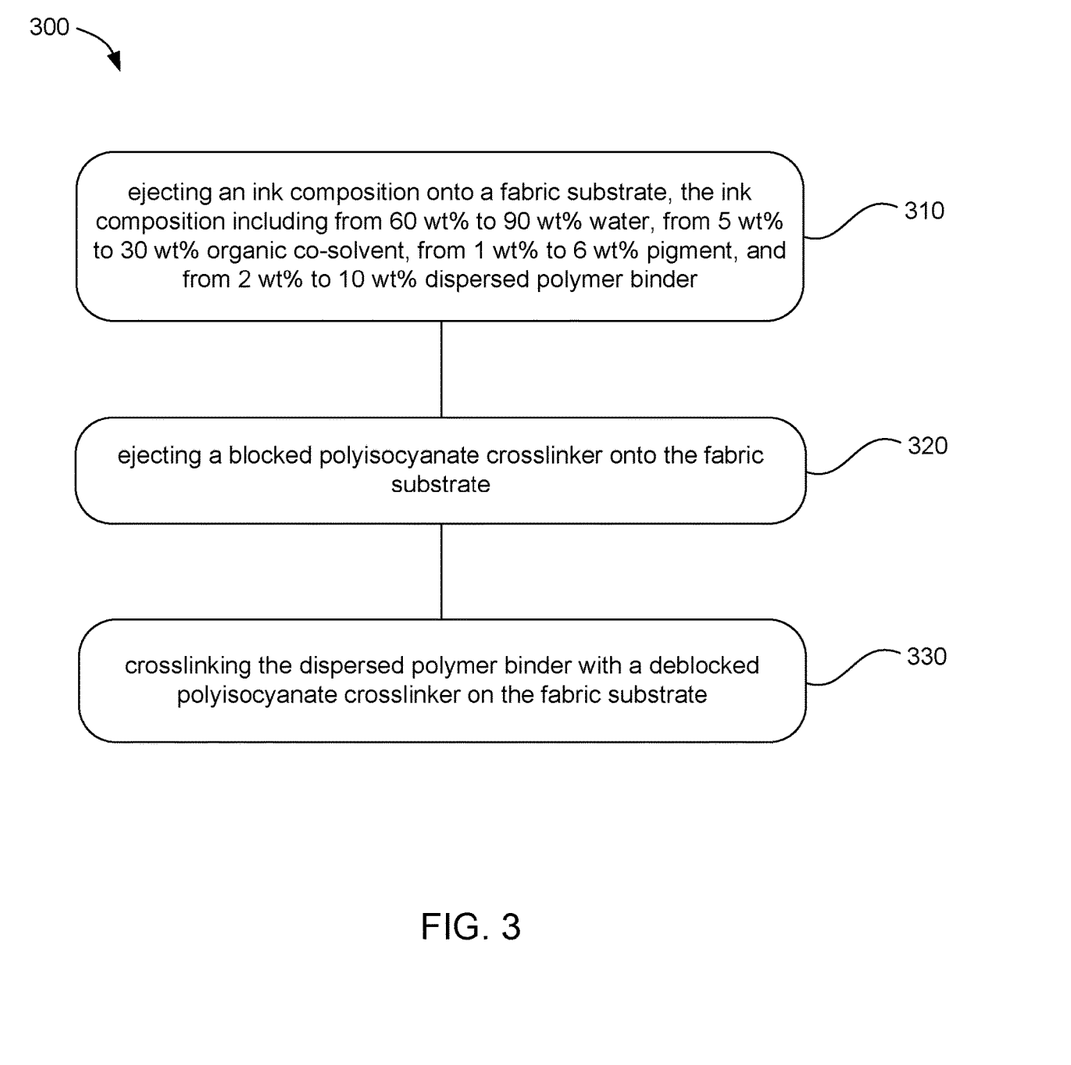
FIG. 3 depicts an example method of textile printing in accordance with the present disclosure.

In another example, and as set forth in FIG. 3, a method 300 of textile printing can include ejecting 310 an ink composition onto a fabric substrate, the ink composition including from 60 wt % to 90 wt % water, from 5 wt % to 30 wt % organic co-solvent, from 1 wt % to 6 wt % pigment, and from 2 wt % to 10 wt % dispersed polymer binder. The method can also include ejecting 320 a blocked polyisocyanate crosslinker onto the fabric substrate, and crosslinking 330 the dispersed polymer binder with a deblocked polyisocyanate crosslinker on the fabric substrate. In one example, the blocked polyisocyanate crosslinker can be ejected onto the fabric substrate as part of the ink composition, and the blocked polyisocyanate crosslinker can be included in the ink composition at from 0.02 wt % to 2 wt %. The weight ratio of the blocked polyisocyanate crosslinker to dispersed polymer binder is from 1:100 to 1:12. In another example, the blocked polyisocyanate crosslinker can be ejected onto the fabric substrate as a separate crosslinker composition to contact the ink composition on the fabric substrate. The crosslinker composition can include from 70 wt % to 94.5 water, from 5 wt % to 25 wt % organic co-solvent, and from 0.5 wt % to 10 wt % blocked polyisocyanate crosslinker. In another example, the deblocked polyisocyanate crosslinker can be generated by applying heat to the blocked polyisocyanate crosslinker on the fabric substrate.

It is noted that, as used in this specification and the appended claims, the singular forms "a," "an," and "the" include plural referents unless the content clearly dictates otherwise.

As used herein, the term "about" is used to provide flexibility to a numerical range endpoint by providing that a given value may be "a little above" or "a little below" the endpoint. The degree of flexibility of this term can be dictated by the particular variable and would be within the knowledge of those skilled in the art to determine based on experience and the associated description herein.

The term "acid value" or "acid number" refers to the mass of potassium hydroxide (KOH) in milligrams that can be used to neutralize one gram of substance (mg KOH/g), such as the latex polymers disclosed herein. This value can be determined, in one example, by dissolving or dispersing a known quantity of a material in organic solvent and then titrating with a solution of potassium hydroxide (KOH) of known concentration for measurement.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, dimensions, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a weight ratio range of about 1 wt % to about 20 wt % should be interpreted to include not only the explicitly recited limits of about 1 wt % and about 20 wt %, but also to include individual weights such as 2 wt %, 11 wt %, 14 wt %, and sub-ranges such as 10 wt % to 20 wt %, 5 wt % to 15 wt %, etc.

EXAMPLES

The following examples illustrate the technology of the present disclosure. However, it is to be understood that the following is only example or illustrative of the application of the principles of the presented formulations and methods. Numerous modifications and alternative methods may be devised by those skilled in the art without departing from the present disclosure. The appended claims are intended to cover such modifications and arrangements. Thus, while the technology has been described above with particularity, the following provides further detail in connection with what are presently deemed to be the acceptable examples.

Example 1—Preparation of Printing Fluids

Four types of printing fluids were prepared in accordance with Tables 1-5, namely i) four pigmented latex ink compositions (K1, C1, M1, or Y1) without a blocked polyisocyanate, ii) two pigmented anionic polyester-polyurethane ink compositions (K2 or M2) without a blocked polyisocyanate, iii) two pigmented anionic polyester-polyurethane ink composition (K3 or M3) with blocked polyisocyanate, and iv) two colorless crosslinker compositions without pigment or dispersed polymer but which included a blocked polyisocyanate (XL1 or XL2) for overcoating the ink compositions of Table 1 and Table 2. Notable, the Table 3 ink composition below is formulated to include a blocked polyisocyanate therein at a lower concentration.

TABLE 1

Four (4) Pigmented Latex Ink Compositions without Blocked Polyisocyanate
(Inks of Table 1 identified as K1, C1, M1, and Y1)

| Ingredient | Category | Concentration (wt %) |
|---|---|---|
| 2-pyrrolidone | Organic Co-solvent | 13 |
| 2-methyl-1,3-propanediol | Organic Co-solvent | 9 |
| Crodafos ® N3 Acid (Croda International Plc. - Great Britain) | Surfactant/Emulsifier | 0.2 |
| Tergitol ® 15-S-7 (Sigma Aldrich - USA) | Surfactant | 0.5 |
| Capstone ® FS-35 (DuPont - USA) | Nonionic Fluorosurfactant | 0.65 |
| Trilon ® M (BASF - Germany) | Chelating Agent | 0.4 |
| Acticide ® B20 (Thor Specialties - USA) | Biocide | 0.2 |
| LL405 wax (filtered) | Wax | 0.8 |
| Acrylic Latex | Dispersed polymer binder | 7 |
| *Pigment | Dispersed Pigment | 1.5-3 |
| Deionized Water | Water | Balance |

*Pigment loading: Black (K) 2 wt %, Cyan (C) 1.5 wt %, Magenta (M) 3 wt %, and Yellow (Y) 2.9 wt %.

TABLE 2

Two (two) Pigmented Polyester-Polyurethane Ink Compositions without
Blocked Polyisocyanate (Inks of Table 2 identified as K2 and M2)

| Ingredient | Category | Concentration (wt %) |
|---|---|---|
| Glycerol | Organic Co-solvent | 8 |
| LEG-1 | Organic Co-solvent | 1 |
| Crodafos ® N3 Acid (Croda International Plc - GB) | Surfactant/Emulsifier | 0.5 |
| Surfynol ® 440 (Evonik - Germany) | Surfactant | 0.3 |
| Acticide ® B20 (Thor Specialties - USA) | Biocide | 0.22 |

TABLE 2-continued

Two (two) Pigmented Polyester-Polyurethane Ink Compositions without Blocked Polyisocyanate (Inks of Table 2 identified as K2 and M2)

| Ingredient | Category | Concentration (wt %) |
|---|---|---|
| Impranil ® DLN-SD (Covestro - Germany) | Dispersed polymer binder | 6 (polymer content) |
| ** Pigment | Dispersed Pigment | 2 |
| Deionized Water | Water | Balance |

** Black (K) or Magenta (M) Pigment Prepared.

TABLE 3

Two (2) Pigmented Polyester-Polyurethane Ink Compositions with Blocked Polyisocyanate (Inks of Table 3 identified a K3 and M3)

| Ingredient | Category | Concentration (wt %) |
|---|---|---|
| Glycerol | Organic Co-solvent | 8 |
| LEG-1 | Organic Co-solvent | 1 |
| Crodafos ® N3 Acid (Croda International Plc - GB) | Surfactant/Emulsifier | 0.5 |
| Surfynol ® 440 (Evonik - Germany) | Surfactant | 0.3 |
| Acticide ® B20 (Thor Specialties - USA) | Biocide | 0.22 |
| Impranil ® DLN-SD (Covestro - Germany) | Dispersed polymer binder | 6 (polymer content) |
| Imprafix ® 2794 (Covestro - Germany) | Blocked polyisocyanate | 0.3 (active) |
| K, C, M, or Y Pigment | Dispersed Pigment | 2 |
| Deionized Water | Water | Balance |

TABLE 4

Two (2) Colorless Crosslinker Composition with Blocked Polyisocyanate (Crosslinker Compositions including XL1 or XL2)

| Ingredient | Category | Concentration (wt %) |
|---|---|---|
| Glycerol | Organic Co-solvent | 10 |
| LEG-1 | Organic Co-solvent | 1 |
| Surfynol ® 440 (Evonik - Germany) | Surfactant | 0.3 |
| Acticide ® B20 (Thor Specialties - USA) | Biocide | 0.22 |
| † Imprafix ® 2794 (XL1); or ‡ Matsui Fixer W-FN (XL2) | Blocked polyisocyanate | 2.4 (active) |
| Deionized Water | Water | Balance |

† Imprafix is from Covestro (Germany).
‡ Matsui Fixer is from Matsui Shikiso Chemical (Japan).

Example 2—Washfastness of Fabrics Printed Using Ink Compositions With/Without Separate Crosslinker Composition The four ink compositions prepared as shown in Tables 1 (K1, C1, M1, and Y1) and the two ink compositions prepared as shown in Table 2 (K2 and M2) were printed alone on both cotton fabric samples, as well as cotton/polyester blend fabric samples. Some of the printed samples were also overprinted (alternatively) with the two different types of Crosslinker Composition (including XL1 or XL2) of Table 4. In printing the various ink composition samples with and without crosslinker composition, 3 drops per pixel 600 dpi durability plots, where each drop was about 12 ng, were printed from a thermal inkjet printhead. The crosslinker composition, when applied, was overprinted with respect to the ink composition at 1 drop per pixel 600 dpi (12 ng per drop), also from a thermal inkjet printhead.

After printing, the printed durability plots were allowed to dry and then cured under heat (150° C. for 3 minutes). The various samples were evaluated to obtain optical density (OD) and L*a*b* color space values, which represented the "pre-washing" values, or reference black or color values. Then, the printed fabric substrates were washed at 40° C. with laundry detergent (e.g., Tide® available from Proctor and Gamble, Cincinnati, Ohio, USA) for 5 cycles, air drying the printed fabric substrates between each washing cycle. After the five cycles, optical density (OD) and L*a*b* values were measured for comparison. The delta E (ΔE) values were calculated using the 1976 standard denoted as $\Delta E_{CIE}$ as well as the 2000 standard denoted as $\Delta E_{2000}$. The data is shown in Tables 5 and 6 below.

TABLE 5

K1, C1, M1, Y1, K2, and M2 Ink; Gray Cotton (untreated) Fabric Substrate; with/without Crosslinker Composition (including XL1 or XL2)

| Ink ID | Crosslinker | OD (Pre-wash) | OD (5 washes) | % ΔOD | $\Delta E_{CIE}$ | $\Delta E_{2000}$ |
|---|---|---|---|---|---|---|
| K1 | XL1 | 0.905 | 0.849 | −6.2 | 1.8 | 1.7 |
| C1 | | 0.833 | 0.762 | −8.5 | 2.9 | 1.7 |
| M1 | | 0.812 | 0.721 | −11.2 | 5.9 | 3.1 |
| Y1 | | 0.758 | 0.669 | −11.8 | 6 | 1.6 |
| K2 | | 0.966 | 0.977 | 1.14 | 0.28 | 0.27 |
| M2 | | 0.89 | 0.888 | −0.28 | 0.99 | 0.49 |
| K1 | XL2 | 0.887 | 0.836 | −5.7 | 2.2 | 2.1 |
| C1 | | 0.833 | 0.765 | −8.1 | 3.2 | 1.7 |
| M1 | | 0.853 | 0.769 | −9.8 | 4.6 | 2.5 |
| Y1 | | 0.832 | 0.742 | −10.8 | 5.4 | 1.3 |
| K2 | | 1.038 | 0.971 | −6.45 | 3.85 | 3.3 |
| M2 | | 0.913 | 0.894 | −2.14 | 1.51 | 0.47 |
| K1 | None | 0.958 | 0.802 | −16.2 | 6.1 | 5.6 |
| C1 | | 0.875 | 0.764 | −12.7 | 5.5 | 3.5 |
| M1 | | 0.876 | 0.746 | −14.8 | 7.6 | 4.2 |
| Y1 | | 0.811 | 0.709 | −12.6 | 6.8 | 1.7 |
| K2 | | 1.035 | 0.926 | −10.49 | 4.66 | 4.06 |
| M2 | | 0.939 | 0.842 | −10.33 | 5.05 | 2.04 |

TABLE 6

K1, C1, M1, Y1, K2, and M2 Ink; Cotton/Polyester (untreated) Fabric Substrate; with/without Crosslinker Composition (including XL1 or XL2)

| Ink ID | Crosslinker | OD (Pre-wash) | OD (5 washes) | % ΔOD | $\Delta E_{CIE}$ | $\Delta E_{2000}$ |
|---|---|---|---|---|---|---|
| K1 | XL1 | 0.923 | 0.872 | −5.5 | 3.7 | 3.4 |
| C1 | | 0.863 | 0.806 | −6.6 | 3.0 | 2.2 |
| M1 | | 0.852 | 0.772 | −9.3 | 4.5 | 2.8 |
| Y1 | | 0.769 | 0.701 | −8.8 | 4.3 | 1.1 |
| K2 | | 0.959 | 0.911 | −5.1 | 3.0 | 2.7 |
| M2 | | 0.848 | 0.800 | −5.7 | 3.0 | 1.4 |
| K1 | XL2 | 0.926 | 0.858 | −7.4 | 3 | 2.7 |
| C1 | | 0.853 | 0.793 | −7 | 2.8 | 2.1 |
| M1 | | 0.858 | 0.791 | −7.8 | 4.3 | 2.6 |
| Y1 | | 0.754 | 0.702 | −6.9 | 4.3 | 1.2 |
| K2 | | 0.981 | 0.919 | −6.3 | 2.5 | 2.2 |
| M2 | | 0.891 | 0.826 | −7.2 | 3.7 | 1.9 |
| K1 | None | 0.968 | 0.827 | −14.6 | 6.8 | 6.2 |
| C1 | | 0.905 | 0.767 | −15.2 | 5.0 | 3.5 |
| M1 | | 0.900 | 0.756 | −16.0 | 7.3 | 4.3 |
| Y1 | | 0.817 | 0.690 | −15.5 | 8.1 | 2.1 |
| K2 | | 1.060 | 0.916 | −13.6 | 6.7 | 5.8 |
| M2 | | 0.947 | 0.809 | −14.6 | 7.0 | 3.3 |

As can be seen in Tables 5 and 6, in every comparison of ink composition printed with a crosslinker composition overcoat (either XL1 or XL2) versus the same ink compositions printed without crosslinker, the printed samples on both cotton and cotton/polyester exhibited greater washfastness with respect to both OD and ΔE values.

Example 3—Washfastness of Fabrics Printed Using Ink Compositions i) without Crosslinker, ii) with a Separate Crosslinker Composition Printed Therewith, and iii) with a Crosslinker Contained Therein The ink compositions prepared as shown in Tables 2 (K2 and M2) and the ink compositions prepared as shown in Table 3 (K3 and M3) were printed alone on both cotton fabric samples, as well as cotton/polyester blend fabric samples. Notably, inks K2 and M2 did not include any crosslinker therein, whereas inks K3 and M3 were formulated to include a blocked polyisocyanate (Imprafix® 2794). Furthermore, additional printed samples of inks K2 and M2 were overprinted with a crosslinker composition (XL1 of Table 4). In printing the various ink composition samples, 3 drops per pixel 600 dpi durability plots, where each drop was about 12 ng, were printed from a thermal inkjet printhead. The crosslinker composition, when applied as a separate fluid, was overprinted with respect to the ink composition at 1 drop per pixel 600 dpi (12 ng per drop), also from a thermal inkjet printhead.

After printing, the printed durability plots were allowed to dry and then cured under heat (150° C. for 3 minutes). The various samples were evaluated to obtain optical density (OD) and L*a*b* values, which represented the "pre-washing" values, or reference black or color values. Then, the printed fabric substrates were washed at 40° C. with laundry detergent (e.g., Tide® available from Proctor and Gamble, Cincinnati, Ohio, USA) for 5 cycles, air drying the printed fabric substrates between each washing cycle. After the five cycles, optical density (OD) and L*a*b* values were measured for comparison. The delta E (ΔE) values were calculated using the 1976 standard denoted as $\Delta E_{CIE}$ as well as the 2000 standard denoted as $\Delta E_{2000}$. The data is shown in Tables 7 and 8 below.

TABLE 7

K2, M2, K3 and M3 Ink; Cotton (untreated) Fabric Substrate; K2 and M2 with/without XL1 Crosslinker Composition Overcoat; K3 and M3 with XL1 Crosslinker Contained in Ink Composition

| Ink ID | Crosslinker | OD (Pre-wash) | OD (5 washes) | % ΔOD | $\Delta E_{CIE}$ | $\Delta E_{2000}$ |
|---|---|---|---|---|---|---|
| K2 | None | 1.035 | 0.926 | −10.49 | 4.66 | 4.06 |
| K2 | Separate XL1 Fluid (Table 4) | 0.966 | 0.977 | 1.14 | 0.28 | 0.27 |
| K3 | XL1 in Ink (Table 3) | 1.047 | 1.038 | −0.86 | 0.72 | 0.63 |
| M2 | None | 0.939 | 0.842 | −10.33 | 5.05 | 2.04 |
| M2 | Separate XL1 Fluid (Table 4) | 0.89 | 0.888 | −0.28 | 0.99 | 0.49 |
| M3 | XL1 in Ink (Table 3) | 0.966 | 0.956 | −0.98 | 0.95 | 0.35 |

TABLE 8

K2, M2, K3 and M3 Ink; Cotton/Polyester (untreated) Fabric Substrate; K2 and M2 with/without XL1 Crosslinker Composition Overcoat; K3 and M3 with XL1 Crosslinker Contained in Ink Composition

| Ink ID | Crosslinker | OD (Pre-wash) | OD (5 washes) | % ΔOD | $\Delta E_{CIE}$ | $\Delta E_{2000}$ |
|---|---|---|---|---|---|---|
| K2 | None | 1.06 | 0.916 | −13.58 | 6.72 | 5.85 |
| K2 | Separate XL1 Fluid (Table 4) | 0.959 | 0.911 | −5.06 | 2.98 | 2.66 |
| K3 | XL1 in Ink (Table 3) | 1.036 | 0.965 | −6.81 | 2.72 | 2.34 |
| M2 | None | 0.947 | 0.809 | −14.57 | 6.98 | 3.31 |
| M2 | Separate XL1 Fluid (Table 4) | 0.848 | 0.8 | −5.72 | 3 | 1.45 |
| M3 | XL1 in Ink (Table 3) | 0.958 | 0.911 | −4.86 | 2.04 | 0.88 |

As can be seen in the data presented in Tables 7 and 8, general improvement in washfastness was verified by comparing pre-wash optical density and $\Delta E_{CIE}$ with post-wash OD and $\Delta E_{CIE}$. This was true for both black and magenta inks, whether or not the blocked polyisocyanate (XL1) was included in the ink composition (K3 or M3) or was overprinted at a 1:3 crosslinker composition (XL1) to ink composition (K2 or M2) volume ratio. Thus, the combination of the ink compositions of Example 1 with the crosslinker (either in the ink or printed in contact therewith from a separate fluid), after being heat cured, e.g., deblocked for crosslinking to occur, can provide a versatile textile printing system for fabrics such as cotton and cotton/polyester blends.

Example 4—Ink Composition Stability

Particle size distribution data was collected for four (4) ink compositions prepared in accordance with Example 1, namely the black ink composition of Table 2 (K2 without crosslinker), the magenta ink composition of Table 2 (M2 without crosslinker), the black ink composition of Table 3 (K3 with XL1), and the magenta ink composition of Table 3 (M3 with XL1). To evaluate stability, both the volume averaged particle size (Mv) and particle size at which 95% of the particles (based on number of particles) were smaller and 5% were larger (D95) was collected. The initial particle size data was collected using a NanoTrac® 150 particle size system. The pigment particle sizes (both Mv and D95) were then determined again using the NanoTra® 150 system after undergoing either freeze-thaw cycling (T-cycle) or accelerated shelf-life (ASL) stress.

The freeze-thaw cycling (T-cycle) included 5 freeze-thaw cycles where 30 mL samples were brought to an initial temperature of 70° C. in 20 minutes, and then maintained at 70° C. for 4 hours. The samples were then decreased from 70° C. to –40° C. in 20 minutes and maintained at –40° C. for 4 hours. This process was repeated, such that each sample was subjected to a total of 5 freeze-thaw cycles. Following the fifth cycle, the samples were allowed to equilibrate to room temperature and the Mv and D95 particle sizes were tested.

With respect to accelerated shelf-life (ASL), 30 mL samples were stored in an oven at 60° C. for 7 days. Following the elevated temperature storage period, the samples were allowed to equilibrate to room temperature and the particle sizes (Mv and D95) were tested.

The results of the stability testing are shown in Tables 9 and 10, where T-cycle=5 Freeze-Thaw Cycles from –40° C. to 70° C.; ASL=Accelerated Shelf Life (ASL) at 60° C. for 1 week; Mv=Volume Averaged Particle Size; D95=95 Percentile Particle Size; and % Δ=Percentile Change from Initial Particle Size (Mv or D95) Compared to After T-cycle or ASL.

TABLE 9

Volume Averaged Particle Size Stability

| Ink ID | Initial Mv (μm) | T-cycle Mv (μm) | T-cycle Mv (%Δ) | ASL Mv (μm) | ASL Mv (%Δ) |
|---|---|---|---|---|---|
| K2 | 0.183 | 0.163 | –11.1 | 0.150 | –18.0 |
| M2 | 0.173 | 0.168 | –2.8 | 0.149 | –13.8 |
| K3 | 0.196 | 0.161 | –17.9 | 0.154 | –21.5 |
| M3 | 0.182 | 0.164 | –9.9 | 0.157 | –13.8 |

TABLE 10

D95 Particle Size Stability

| Ink ID | Initial D95 (μm) | T-cycle D95 (μm) | T-cycle D95 (%Δ) | ASL D95 (μm) | ASL D95 (%Δ) |
|---|---|---|---|---|---|
| K2 | 0.429 | 0.340 | –20.7 | 0.298 | –30.6 |
| M2 | 0.439 | 0.353 | –19.6 | 0.293 | –33.3 |
| K3 | 0.517 | 0.346 | –33.1 | 0.311 | –39.8 |
| M3 | 0.522 | 0.352 | –32.6 | 0.337 | –35.4 |

As can be seen in Tables 9 and 10, the particle size stability for the pigments in the ink compositions, whether or not the polyisocyanate was present in the ink composition or not, was good both with respect to Mv and D95 under T-cycle and ASL testing protocols, with only marginally better pigment stability when the crosslinker (XL1) was excluded from the ink composition.

While the present technology has been described with reference to certain examples, various modifications, changes, omissions, and substitutions can be made without departing from the spirit of the disclosure. It is intended, therefore, that the disclosure be limited only by the scope of the following claims.

What is claimed is:

1. A method of textile printing, comprising:
ejecting an ink composition onto a fabric substrate, the ink composition comprising from 60 wt % to 90 wt % water, from 5 wt % to 30 wt % organic co-solvent, from 1 wt% to 6 wt % pigment, and from 2 wt % to 10 wt % dispersed polymer binder, wherein the ink composition does not include a blocked polyisocyanate crosslinker;
ejecting a crosslinker composition that is separate from the ink composition, wherein the crosslinker composition comprises a blocked polyisocyanate crosslinker, onto the fabric substrate;
deblocking the blocked polyisocyanate: crosslinker; and
crosslinking the dispersed polymer binder with the deblocked polyisocyanate crosslinker on the fabric substrate.

2. The method of textile printing of claim 1, wherein the crosslinker composition is ejected onto the fabric substrate in an amount such that the weight ratio of the blocked polyisocyanate crosslinker ejected onto the fabric substrate to dispersed polymer binder ejected onto the fabric substrate is from 1:100 to 1:12.

3. The method of textile printing of claim 1, wherein the crosslinker composition comprises from 70 wt % to 94.5 water, from 5 wt % to 25 wt % organic co-solvent, and from 0.5 wt % to 10 wt % blocked polyisocyanate crosslinker.

4. The method of textile printing of claim 1, wherein the deblocked polyisocyanate crosslinker is generated by applying heat to the blocked polyisocyanate crosslinker on the fabric substrate.

5. The method of textile printing of claim 1, wherein the blocked polyisocyanate crosslinker includes a blocked polyisocyanate trimer.

6. The method of textile printing of claim 5, wherein the blocked polyisocyanate trimer has the structure:

where R is independently includes a C2 to C10 branched or straight-chained alkyl, C6 to C20 alicyclic, C6 to C20 aromatic, or a combination thereof; and BL includes a phenol blocking group, a lactam blocking group, an oxime blocking group, a pyrazole blocking group, or a combination thereof; x is from greater than 0 to 1; and UL includes a hydrophilic dispersing group.

7. The method of textile printing of claim 6, wherein R is C4 to C8 alkyl and BL is a dimethyl pyrazole.

8. The method of textile printing of claim 1, wherein the dispersed polymer binder has an average particle size from 20 nm to 500 nm, and includes an acrylic latex polymer, a styrene acrylic latex polymer, a polyester-polyurethane polymer, or a mixture thereof.

9. A textile printing system, comprising:
a fabric substrate; and
an ink composition, comprising:
from 1 wt % to 6 wt % pigment, and
from 2 wt % to 24 wt % dispersed polymer binder, wherein the ink composition does not include a blocked polyisocyanate crosslinker; and a crosslinker composition, comprising:
from 70 wt % to 94.5 water,
from 5 wt % to 25 wt % organic co-solvent, and
from 0.5 wt % to 10 wt % blocked polyisocyanate crosslinker.

10. The textile printing system of claim 9, wherein the blocked polyisocyanate crosslinker includes a blocked polyisocyanate trimer.

11. The textile printing system of claim 10, wherein the blocked polyisocyanate trimer has the structure:

$$(NCO)_3R_3(NHCO)_3(BL)_{3-x}(DL)_x$$

where R is independently includes a C2 to C10 branched or straight-chained alkyl, C6 to C20 alicyclic, C6 to C20 aromatic, or a combination thereof; and BL includes a phenol blocking group, a lactam blocking group, an oxime blocking group, a pyrazole blocking group, or a combination thereof; x is from greater than 0 to 1; and DL includes a hydrophilic dispersing group.

12. The textile printing system of claim 11, wherein R is C4 to C8 alkyl and BL is a dimethyl pyrazole.

13. The textile printing system of claim 9, wherein the blocked polyisocyanate crosslinker is present in the crosslinker composition at from 1.5 wt % to 4 wt %.

14. The textile printing system of claim 9, wherein the dispersed polymer binder has an average particle size from 20 nm to 500 nm, and includes an acrylic latex polymer, a styrene acrylic latex polymer, a polyester-polyurethane polymer, or a mixture thereof.

15. The method of textile printing of claim 1, wherein the crosslinker composition is colorless.

16. The method of textile printing of claim 1, wherein the crosslinker composition does not include a polymer binder.

17. The textile printing system of claim 9, wherein the crosslinker composition is colorless.

18. The textile printing system of claim 9, wherein the crosslinker composition does not include a polymer binder.

* * * * *